(12) United States Patent
Petrick et al.

(10) Patent No.: US 8,188,714 B2
(45) Date of Patent: May 29, 2012

(54) CARRYING CASE

(75) Inventors: Tad Petrick, Evanston, IL (US); Philip Sopicki, Glenview, IN (US); John Poremba, Elmhurst, IL (US); Brian Wixted, Crystal Lake, IL (US); Jim Fisher, Waukegan, IL (US); Harrison Yuan, Buffalo Grove, IL (US); Mike Hansen, Village of Lakewood, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 0 days.

(21) Appl. No.: 12/914,077

(22) Filed: Oct. 28, 2010

(65) Prior Publication Data
US 2011/0036747 A1 Feb. 17, 2011

Related U.S. Application Data

(63) Continuation of application No. PCT/US2010/021263, filed on Jan. 15, 2010.

(60) Provisional application No. 61/145,566, filed on Jan. 18, 2009.

(51) Int. Cl.
*H02J 7/00* (2006.01)
(52) U.S. Cl. ......... 320/115; 320/107; 320/112; 320/114
(58) Field of Classification Search .................. 320/107, 320/112, 114, 115
See application file for complete search history.

(56) References Cited

U.S. PATENT DOCUMENTS

| 5,505,328 | A | * | 4/1996 | Stribiak | 220/4.22 |
| 5,698,818 | A | * | 12/1997 | Brench | 174/385 |
| 6,571,949 | B2 | * | 6/2003 | Burrus et al. | 206/373 |
| 6,729,514 | B1 | * | 5/2004 | Delgado | 224/404 |
| 2004/0010889 | A1 | | 1/2004 | Chen | |
| 2006/0086518 | A1 | * | 4/2006 | Kawaguchi et al. | 174/35 R |
| 2008/0007212 | A1 | * | 1/2008 | Theytaz et al. | 320/107 |
| 2008/0150367 | A1 | * | 6/2008 | Oh et al. | 307/80 |

FOREIGN PATENT DOCUMENTS

| JP | 1998-137025 | 5/1998 |
| JP | 2001-044680 | 2/2001 |
| JP | 2001-299427 | 10/2001 |
| JP | 2003-167858 | 6/2003 |

OTHER PUBLICATIONS

Written Opinion of the International Searching Authority from corresponding PCT application PCT/US2010/021263.

\* cited by examiner

*Primary Examiner* — Samuel Berhanu
(74) *Attorney, Agent, or Firm* — Anderson Gorecki & Manaras LLP

(57) ABSTRACT

A system for maintaining a large number of Handheld Electronic Devices is implemented as a carrying case having circuitry configured to connect to the Handheld Electronic Devices to enable the HEDs to be charged and synchronized. The carrying case has a central area configured to hold the circuitry for charging and synchronizing the HEDs, and a pair of divider structures on either side of the central area to hold the HEDs in a protective manner while stored in the carrying case. A grounded protective coating is applied to the interior of the carrying case to dissipate electromagnetic radiation generated by the circuitry and/or HEDs within the carrying case.

11 Claims, 8 Drawing Sheets

CARRYING CASE

CROSS-REFERENCE TO RELATED APPLICATIONS

This application is a continuation of international application PCT/US2010/021263, filed Jan. 15, 2010, which claims priority to U.S. Provisional Patent Application No. 61/145,566, filed Jan. 18, 2009, entitled "Carrying Case For Charging, Synchronizing And Storing Handheld Electronic Devices," the content of which is hereby incorporated herein by reference.

BACKGROUND OF THE INVENTION

1. Field of the Invention

The present invention relates to computer storage systems and, more particularly, to a carrying case for charging, synchronizing and storing handheld electronic devices.

2. Description of the Related Art

Portable handheld devices that are capable of storing content such as music and video have recently become popular. For example, devices such as the iPOD™ from Apple are popular devices that are commonly used to store music and/or video files. The music may then be played on demand either through earphones, or through another stereo device via a docking station. As used herein, the term "Handheld Electronic Device or (HED)" will be used to refer to a portable and handheld digital electronic device for recording, organizing, transmitting, manipulating and reviewing text, data, audio, image, and video files.

Although iPODs and other HEDs were initially made popular in connection with users that wanted to be able to have a portable music library, such HEDs are now being used for other purposes. For example, museums are starting to load audio and/or audio/video museum tours on HEDs such as iPODs so that users can listen to and/or watch a guided program as they proceed through the museum. Such guided programs are commonly used to enable a person knowledgeable about art to narrate a guided tour one time, and then enable museum patrons to obtain the benefit of the guided tour at a later time by listening to the pre-recorded guided tour.

In addition to museums, other forums are also beginning to use HEDs such as iPODs to provide users with content. For example, a conference may provide a conference attendee with a HED to provide the conference attendees with information about the conference. Similarly, a resort may provide a person with a HED when the person arrives at the resort to enable the person to listen to a program about the resort.

U.S. patent application Ser. No. 11/978,313, filed Oct. 29, 2007, entitled "System For Maintaining A Large Number Of Handheld Electronic Devices" describes one system for storing and synchronizing a large number of handheld electronic devices. The content of this application is hereby incorporated herein by reference. This system is implemented in the form of a cart, which allows a large number of HEDs to be maintained. Although this system has particular advantages, it would still be desirable to provide another system that would enable users to maintain a large number of Handheld Electronic Devices.

SUMMARY OF THE INVENTION

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A system for maintaining a large number of Handheld Electronic Devices is implemented as a carrying case having circuitry configured to connect to the Handheld Electronic Devices to enable the HEDs to be charged and synchronized. The carrying case has a central area configured to hold the circuitry for charging and synchronizing the HEDs, and a pair of divider structures on either side of the central area to hold the HEDs in a protective manner while stored in the carrying case. A grounded protective coating is applied to the interior of the carrying case to dissipate electromagnetic radiation generated by the circuitry and/or HEDs within the carrying case.

BRIEF DESCRIPTION OF THE DRAWINGS

Aspects of the present invention are illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures.

DETAILED DESCRIPTION

Figure 1:
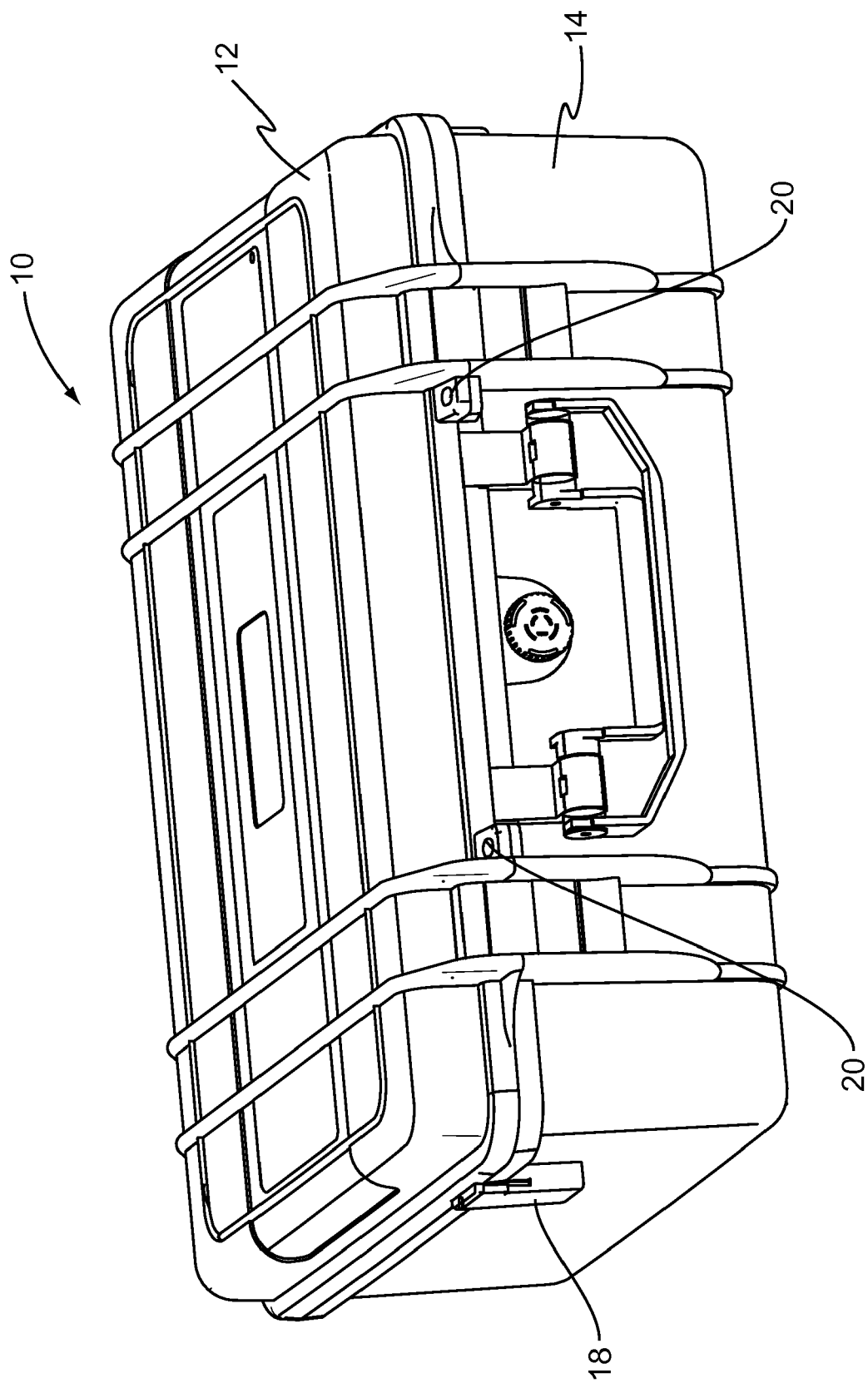
FIG. 1 is a front perspective view of a carrying case for charging, synchronizing, and storing Handheld Electronic Devices (HEDs) according to an embodiment of the invention.
Figure 2:
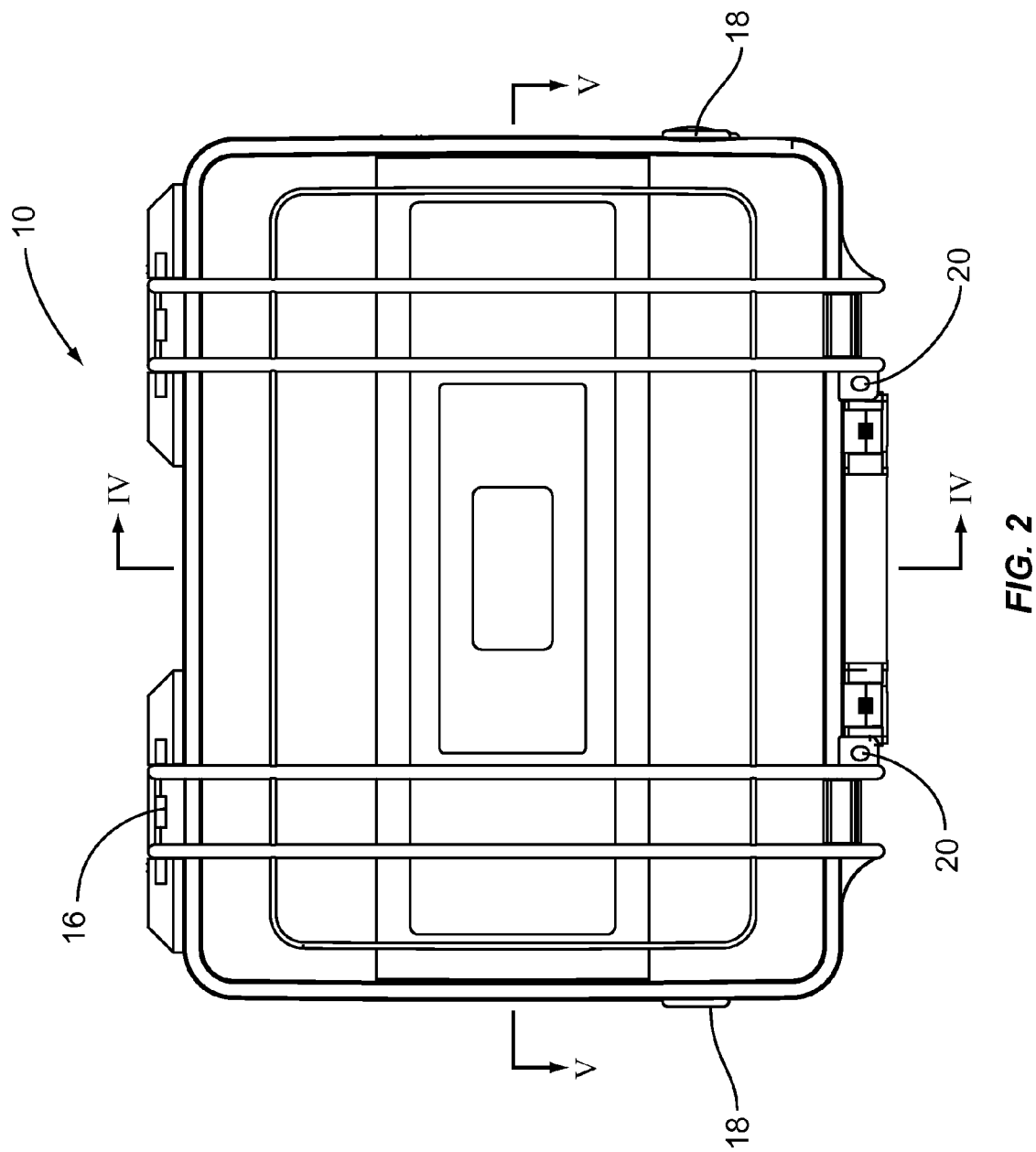
FIG. 2 is a top view of the carrying case of FIG. 1.
Figure 3:
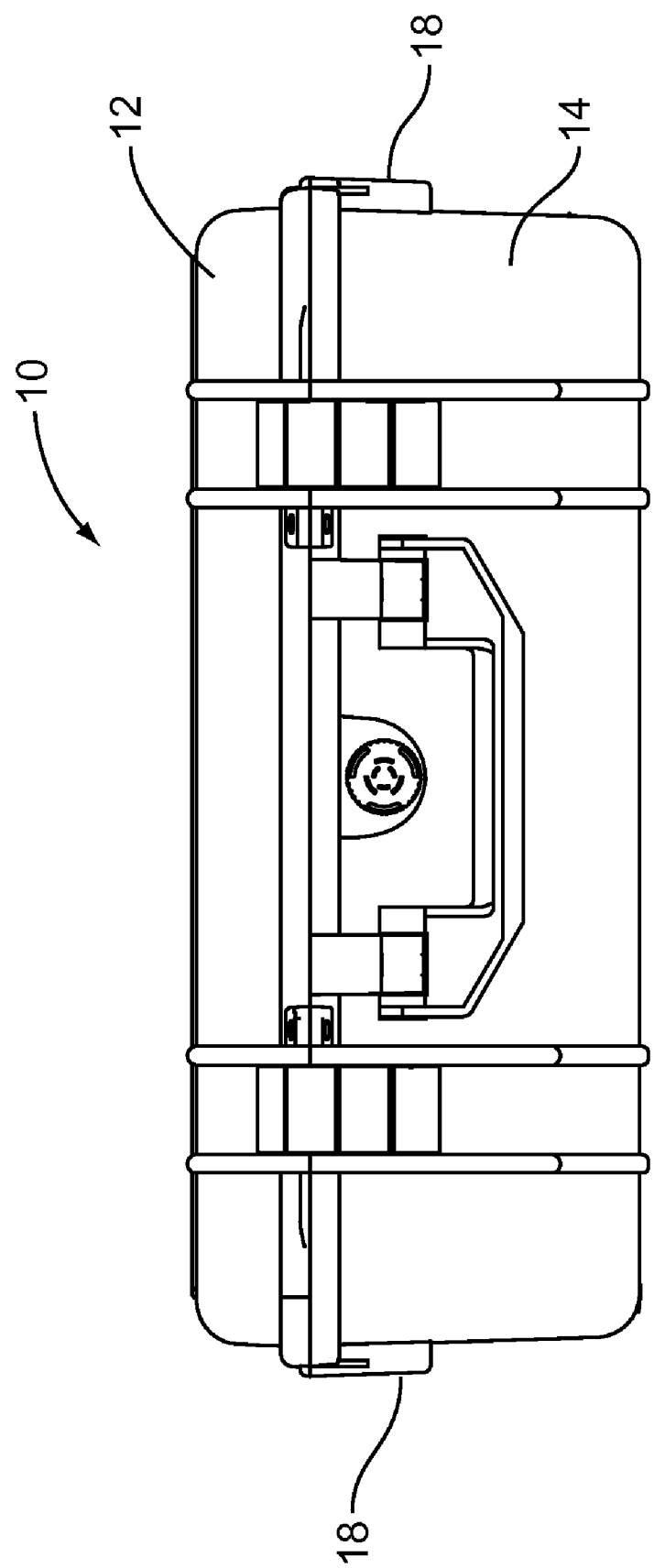
FIG. 3 is a front view of the carrying case of FIG. 1.

A carrying case for charging, synchronizing, and storing a large number of Handheld Electronic Devices (HEDs) 10 includes an outer shell having a top portion 12 and a bottom portion 14. The two portions are connected by a hinge structure 16 which, in one embodiment, may be implemented using one or more barrel hinges. Other types of hinges may be used as well. In one embodiment, the case is implemented to have approximately the same size and shape as a briefcase to enable up to 20 handheld electronic devices to be charged, synchronized and stored within the carrying case. Larger and smaller cases may be created as well to support a larger number of HEDs or a smaller number of HEDs. The top and bottom portions may be continuously affixed while opened or, alternatively, the top portion may be removable from the bottom portion such that the top may be removed from the hinge structure after being rotated into the open position.

One or more clasps 18 hold the top and bottom halves of the case together when closed. Optionally, a security mechanism such as a key lock and/or a padlock hole 20 may be provided to enable the carrying case to be locked to protect the HEDs while the carrying case is unattended.

The carrying case includes a divider structure 22 (see FIG. 6) configured to create compartments 24, each of which is sized to hold a HED to prevent it from contacting other HEDs within the carrying case. The divider structure may be formed from cushioning foam. A central area 26 within the carrying case includes circuitry for charging and synchronizing the HEDs. The HEDs may be connected to the circuitry via Universal Serial Bus (USB) connectors or other connectors, to enable the HEDs to receive power from the circuitry and to be synchronized with an exterior computer (not shown) via the circuitry. Additional details about one possible divider structure and circuitry that may be used to implement the interior of the carrying case is described in U.S. patent application Ser. No. 11/978,313, filed Oct. 29, 2007, entitled SYSTEM FOR MAINTAINING A LARGE NUMBER OF HANDHELD ELECTRONIC DEVICES, the content of which is hereby incorporated herein by reference. Details associated with the divider structure and location of the circuitry are shown in greater detail in FIG. 9.

Figure 6:
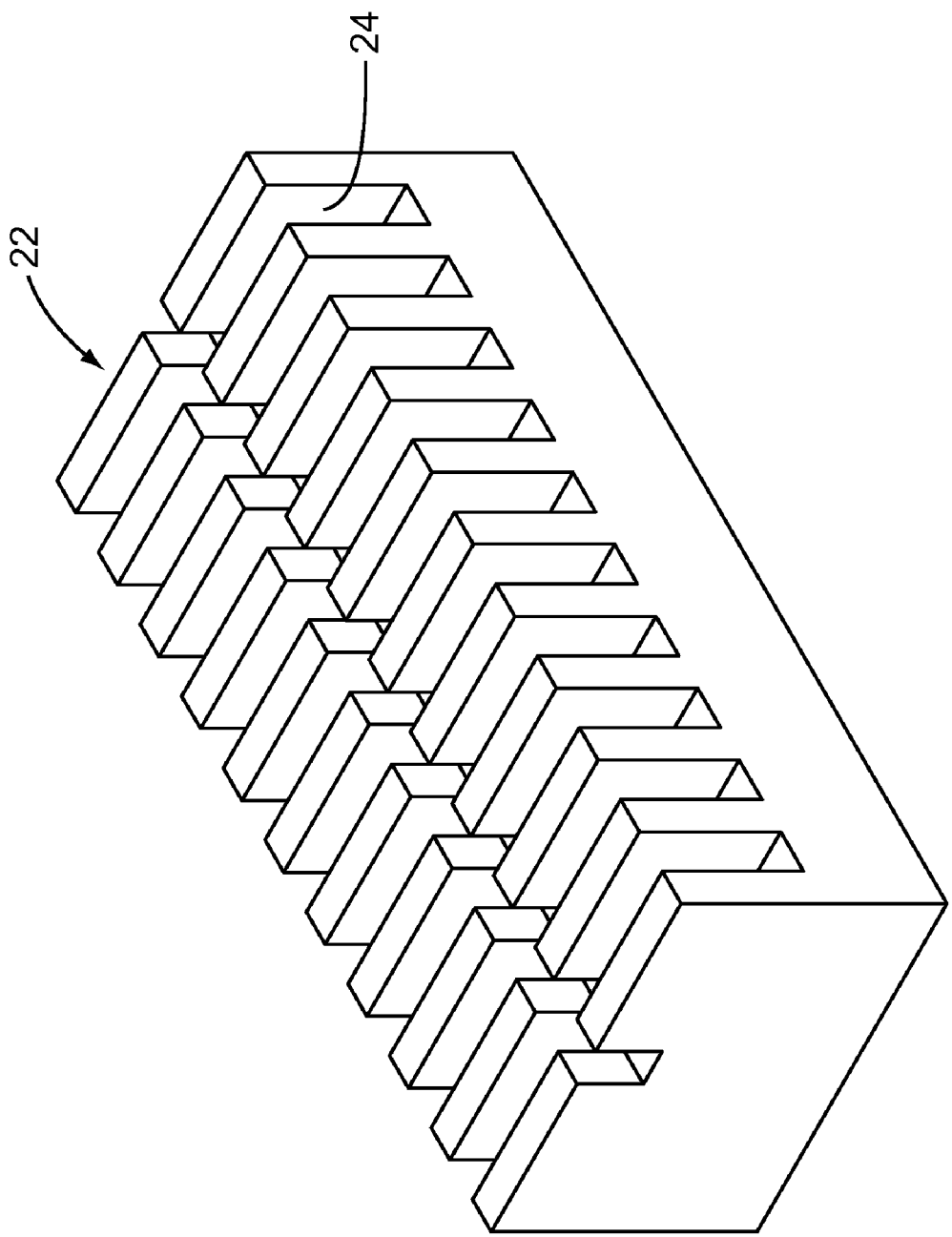
FIG. 6 is a perspective view of a foam divider structure for use in the carrying case of FIG. 1.
Figure 9:
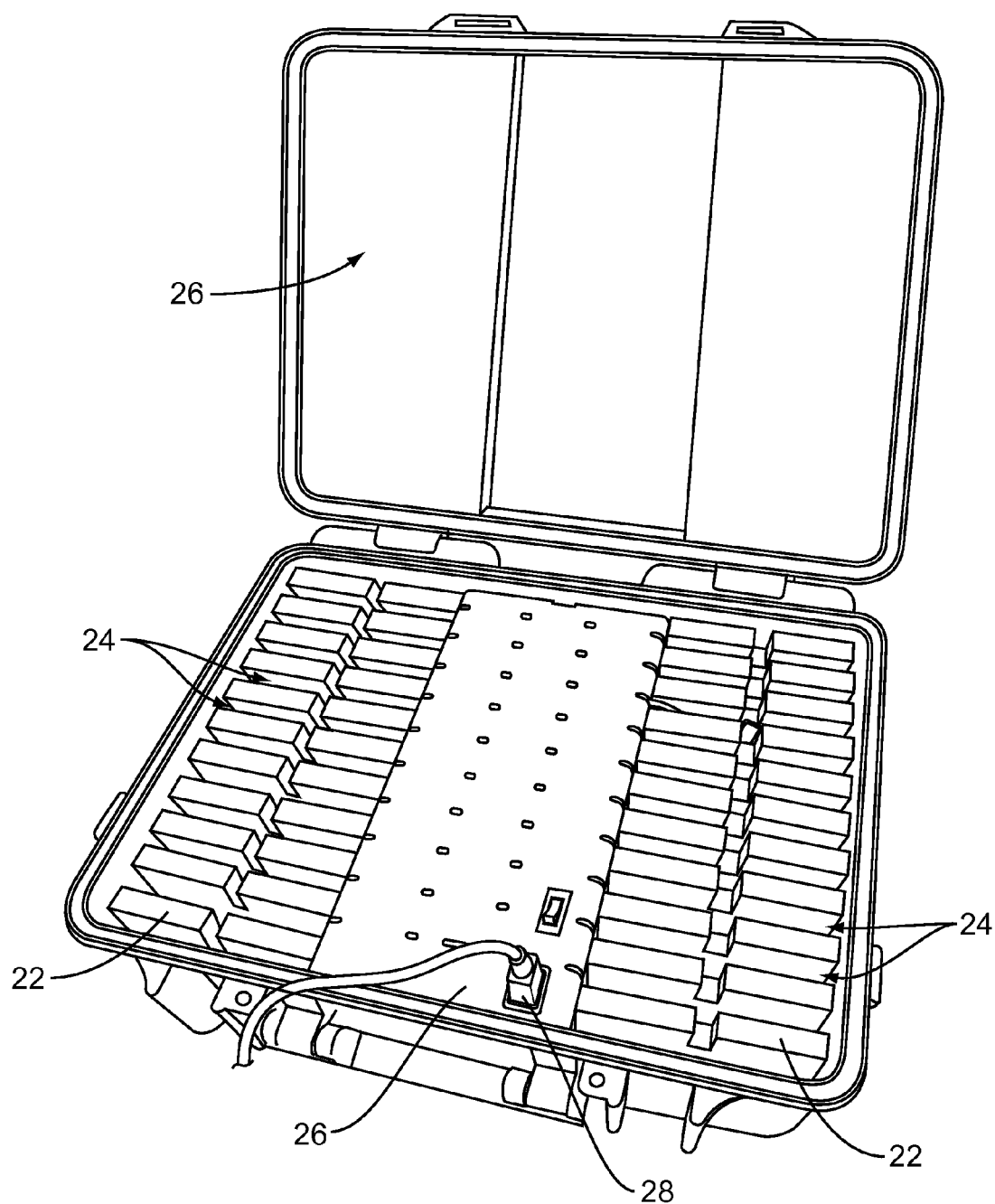
FIG. 9 is a front perspective view of a carrying case for charging, synchronizing, and storing Handheld Electronic Devices (HEDs) in an open position according to an embodiment of the invention.

As shown in FIGS. 6 and 9, the divider structure 22 is included in the carrying case to define individual compartments sized to hold Handheld Electronic Devices (HEDs). The divider structure may be implemented using a soft material such as foam or other cushioning material that will cushion the HEDs while they are maintained in the carrying case to minimize the amount of jarring that is experienced by the HEDs as they are transported using the carrying case. Example HEDs include MP-3 players such as iPOD™ HEDs available from Apple Computer Corp. and other types of HEDs. As new HEDs are developed, differently sized dividers may be provided to securely hold the HEDs so that they may be retained within the carrying case in a safe and secure manner. Since the carrying case may be expected to be bumped and jostled more than a computer cart, preferably the foam used to implement the divider structure 22 should snugly contact the HEDs while contained in the carrying case. A foam layer 26 may be applied to the interior of the top half of the carrying case as well.

The central area 26 of the carrying case contains an electrical circuit board, to which the HEDs may be connected when placed in the drawer. The electrical circuit board may be covered by a cover (made of plastic, metal, or another material) to prevent accidental contact by a user. The central area may also include power supply components, such as a power transformer, that may be used to step down the line current coming into the carrying case from a wall outlet, and to condition the power for transmission to the circuit board.

The electrical circuit board may be configured as a 20 port USB hub that will enable HEDs connected to the electrical circuit board to be charged as well as synchronized with a laptop computer or other data source. Additional details about a possible 20 port USB hub that may be used in the carrying case are described in U.S. patent application Ser. No. 11/978, 313, filed Oct. 29, 2007, entitled SYSTEM FOR MAINTAINING A LARGE NUMBER OF HANDHELD ELECTRONIC DEVICES, the content of which is hereby incorporated herein by reference.

The 20 port USB hub is configured to both synchronize and charge HEDs connected to ports of the USB hub. Power may be connected to the 20 port USB hub via receptacle 28 that is accessible when the case is open (see FIG. 9) to enable the HEDs to be charged. A computer may be connected to the 20 port USB hub via a USB port or other data port (not shown) to enable the content of the HEDs to be synchronized. Both synchronization and charging may occur at the same time. The HEDs may be charged and synchronized while the carrying case is closed, or while open. Where the carrying case is designed to enable the HEDs to be powered and/or synchronized while the case is closed, appropriate electrical and data connectors may be provided on the exterior of the carrying case to enable the case to be plugged into an external power source and to a computer. Optionally, if necessary, a cooling system such as an air circulation system (e.g. fan) may be provided to circulate air within the carrying case and to exhaust warm air from the carrying case where the HEDs are to be active while the case is closed.

Figure 7:
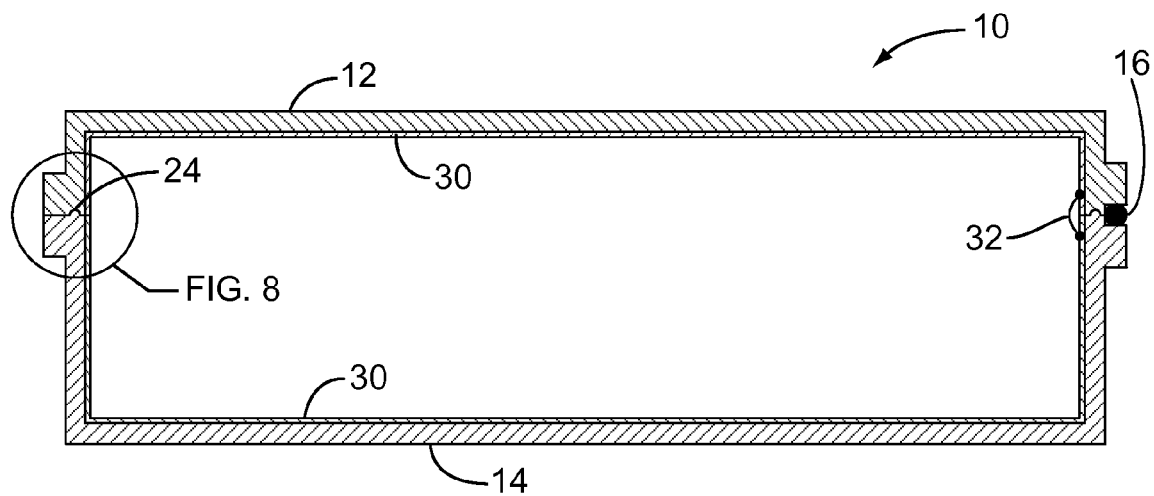
FIG. 7 is a cross-sectional view taken along lines V-V of FIG. 2 and showing an interior coating applied to the carrying case according to an embodiment of the invention.

In one embodiment, the carrying case is painted, on the inside, with a copper paint that provides electromagnetic shielding. FIG. 7 shows one embodiment of this, in which electrically conductive material 30 has been applied to an interior surface of the case. Both halves of the carrying case 12, 14 are painted in this embodiment, and the two halves are electrically connected, for example by a wire 32. The copper paint provides electrical shielding so that electromagnetic radiation, generated by the handheld electronic devices as they are charged and synchronized, is attenuated by the carrying case. The wire 32 grounds the two halves together to provide continuous shielding around the HEDs and electrical components of the case. The interior conductive layer 30 is also connected to ground, such as to a ground associated with the electrical circuitry contained within the case, to enable EM radiation to be collected and dissipated.

The copper paint may create a complete Faraday cage or a substantially complete Faraday cage to substantially attenuate electromagnetic radiation to reduce the amount of radiation that is emitted from the carrying case. Although copper paint or other electrically conductive paint is preferable, for ease of application and manufacture, other electrically conductive structures may be used as well. For example, a wire mesh or other electrically shielding structure may be used to attenuate electromagnetic radiation generated by the HEDs.

Figure 4:
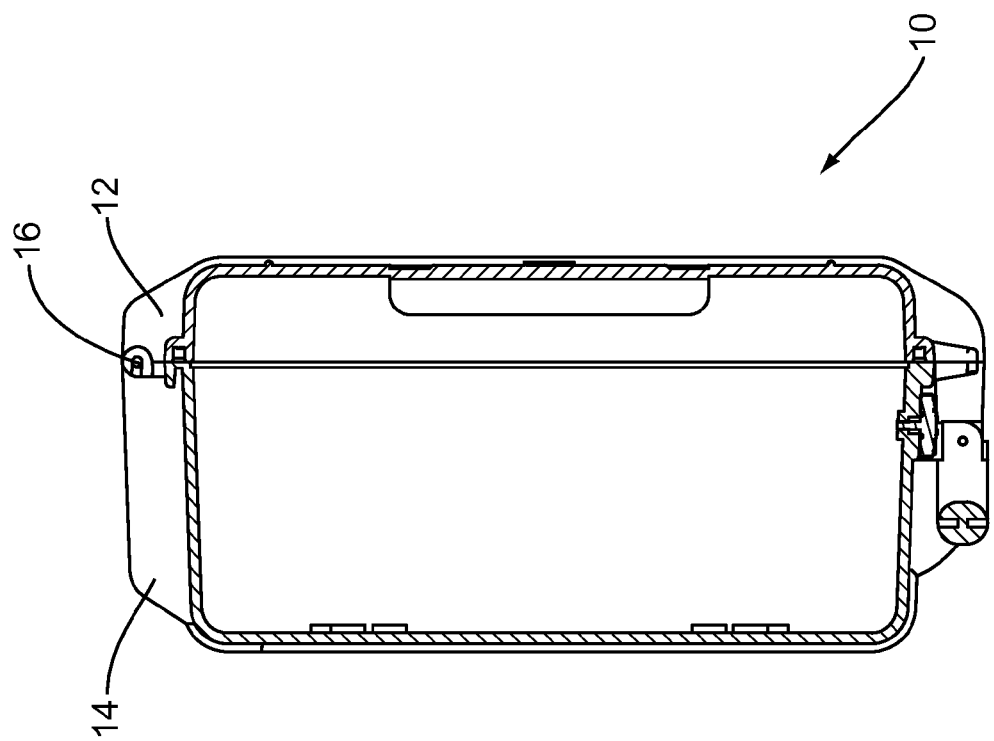
FIG. 4 is a cross-sectional view taken along lines IV-IV of FIG. 2.
Figure 5:
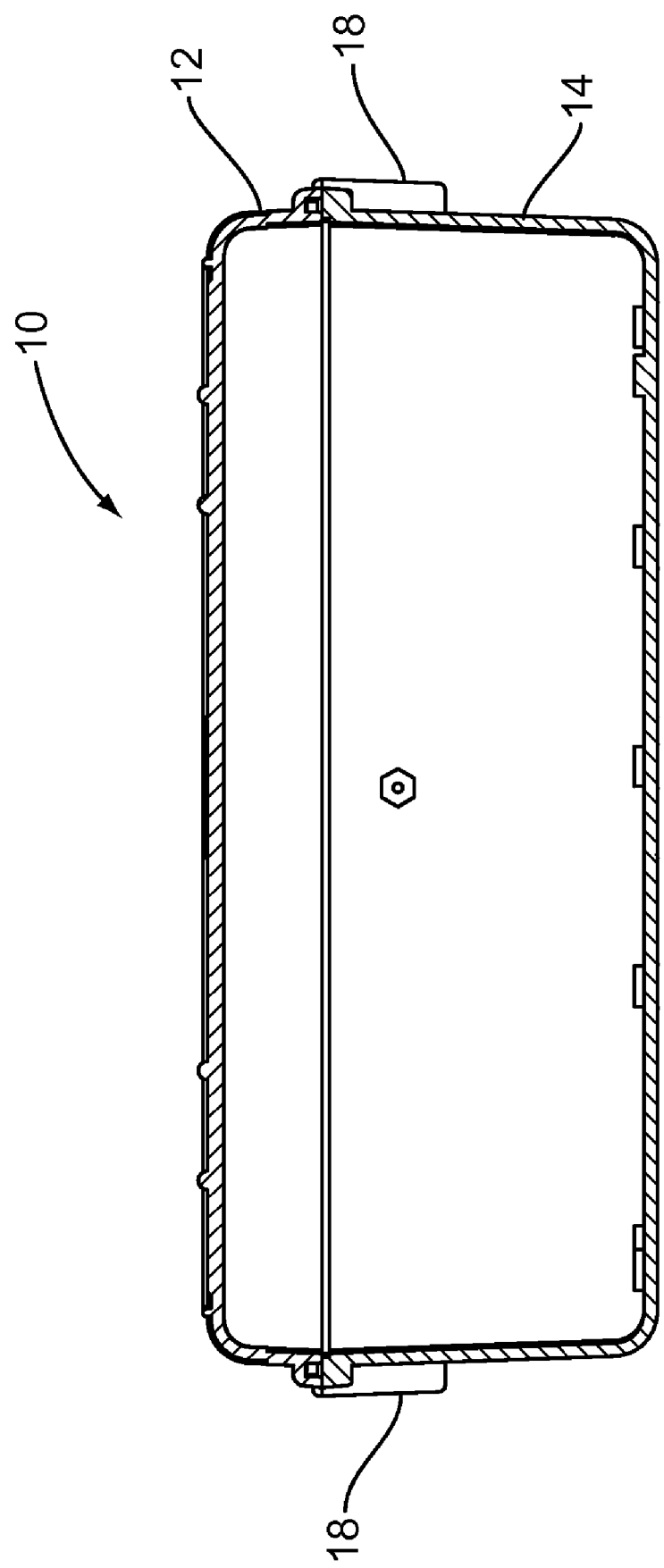
FIG. 5 is a cross-sectional view taken along lines V-V of FIG. 2.

FIGS. 4 and 7 show an example carrying case in cross-section. As shown in these figures, both the top half 12 and bottom half 14 of the carrying case are coated with an electrically conductive material 20 such as copper paint. The paint may be sprayed into the interior of the carrying case or applied in another manner. The electrically conductive layer forms an electrically conductive liner within the carrying case. The grounded electrically conductive liner enables radiation that is generated within the carrying case to be absorbed and dissipated. The top half 12 and bottom half 14 are connected by a wire 22 to enable the two halves to remain at a common potential. Optionally, the electrically conductive liner may be connected to a common ground with the electrical circuit (e.g. 20 port USB hub) that is included in the carrying case to charge and synchronize the HEDs.

Figure 8:
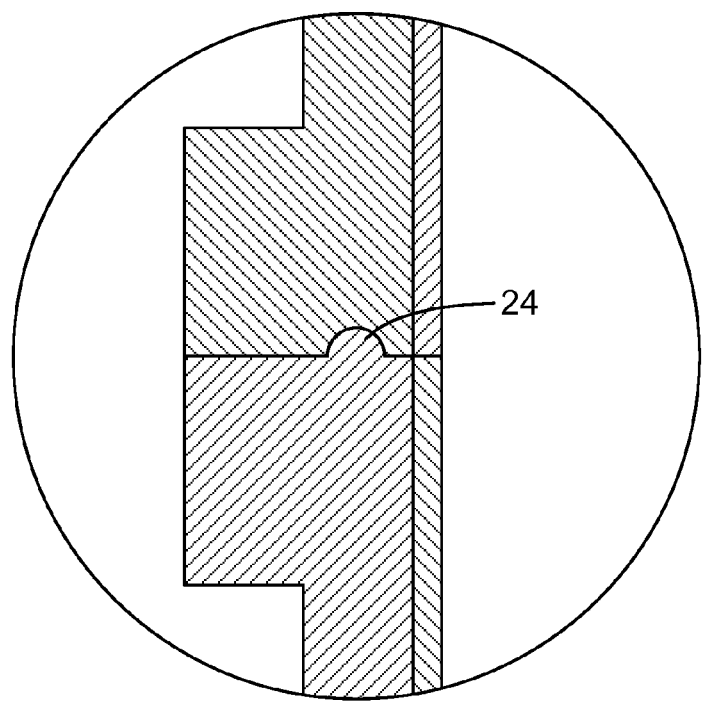
FIG. 8 is an expanded blown-up cross-sectional view of one of the joints of the carrying case of FIG. 7.

FIG. 8 shows a portion of an edge of the carrying case in cross-section. As shown in FIG. 8, the top may be provided with a recess and the bottom may be configured to include a bump to enable the top and bottom halves to intermesh when closed. The bump/recess may be switched if desired such that the top includes the bump and the bottom includes the recess. The bump and recess provide a mechanical alignment mechanism to ensure that the top and bottom close correctly to protect the HEDs stored within the carrying case.

Optionally a rubber gasket or other sealing material may be provided in the recess to enable the top and bottom to be sealed to prevent moisture from entering the carrying case. The case may be made from a water resistant material such as PVC or other sufficiently strong plastic material. The case may also be made from other materials, such as metal or wood covered with leather. Optionally, the outside of the carrying case may be covered with a decorative surface treatment.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A carrying case for charging, synchronizing, and storing a large number of similar Handheld Electronic Devices, comprising:
    an outer shell having a top portion and a bottom portion that are hinged together to enable the top and bottom portions to be selectively opened, to enable access to the interior, and closed, to restrict access to the interior;
    a divider structure to hold and cushion the large number of similar handheld electronic devices within the interior of the carrying case to prevent the large number of similar handheld electronic devices from contacting each other while stored within the carrying case;
    circuitry for charging and synchronizing the large number of similar handheld electronic devices while stored within the carrying case; and
    an electrical surrounding structure separate from the outer shell to attenuate electromagnetic radiation generated by the large number of similar handheld electronic devices from escaping the carrying case when the top portion and bottom portion are closed;
    wherein the circuitry is a multi-port USB hub; and
    wherein the divider structure includes a first divider on a first side of the circuitry and a second divider on the second side of the circuitry, to enable handheld electronic devices to be stored and plugged into the circuitry from both sides of the circuitry.

2. The carrying case of claim 1, wherein the outer shell is formed from PVC.

3. The carrying case of claim 1, wherein the electrical surrounding structure is formed by painting an electrically conductive paint on an interior surface of the top portion and on an interior surface of the bottom portion.

4. The carrying case of claim 3, wherein the electrically conductive paint on the interior surface of the top portion is electrically connected to the electrically conductive paint on the interior surface of the lower portion.

5. The carrying case of claim 1, wherein the divider structure is formed of foam padding.

6. The carrying case of claim 5, further comprising a foam padding layer on an interior area of the top portion of the carrying case.

7. The carrying case of claim 1, wherein the circuitry is located in a central area of the bottom portion of the carrying case.

8. The carrying case of claim 1, wherein the top portion of the outer shell has a first edge, the bottom portion of the outer shell each has a second edge, and wherein an alignment mechanism is integrated into the first edge and second edge to ensure that the top and bottom portion close correctly to protect the handheld electronic devices stored within the carrying case.

9. The carrying case of claim 8, wherein the alignment mechanism comprises a circumferentially extending bump in the second edge and a circumferentially extending recess in the first edge, the circumferentially extending recess being sized to receive the circumferentially extending bump when the carrying case is closed.

10. The carrying case of claim 8, wherein the alignment mechanism comprises a circumferentially extending bump in the first edge and a circumferentially extending recess in the second edge, the circumferentially extending recess being sized to receive the circumferentially extending bump when the carrying case is closed.

11. The carrying case of claim 8, wherein the alignment mechanism forms a watertight seal.

* * * * *